(No Model.) 3 Sheets—Sheet 1.

J. A. WITMER.
ROAD CART.

No. 371,115. Patented Oct. 4, 1887.

Witnesses.
G. Sargent Elliott
E. M. Johnson

John A. Witmer.
Inventor
Atty.

(No Model.) 3 Sheets—Sheet 2.

J. A. WITMER.
ROAD CART.

No. 371,115. Patented Oct. 4, 1887.

WITNESSES
G. S. Elliott
E. W. Johnson

John A Witmer.
INVENTOR
Attorney (No Model.)  3 Sheets—Sheet 3.

J. A. WITMER.
ROAD CART.

No. 371,115. Patented Oct. 4, 1887.

WITNESSES
G. S. Elliott
E. W. Johnson

John A. Witmer
INVENTOR

Attorney

UNITED STATES PATENT OFFICE.

JOHN A. WITMER, OF WAKARUSA, INDIANA.

ROAD-CART.

SPECIFICATION forming part of Letters Patent No. 371,115, dated October 4, 1887.

Application filed June 30, 1887. Serial No. 243,011. (No model.)

*To all whom it may concern:*

Be it known that I, JOHN A. WITMER, a citizen of the United States of America, residing at Wakarusa, in the county of Elkhart and State of Indiana, have invented certain new and useful Improvements in Road-Carts; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in two-wheel vehicles of that class which are usually termed "road-carts," the object of my invention being to provide a simple and cheap vehicle, which is mounted on two wheels and constructed so that the same will be easy-riding, the springs taking up what is technically known as the "horse movement," while the jolts or jars caused by the inequality of the road are taken up by suitable springs.

With the above end in view my invention consists in the construction and combination of the parts, as will be hereinafter fully set forth, and specifically pointed out in the claims.

Figure 1:
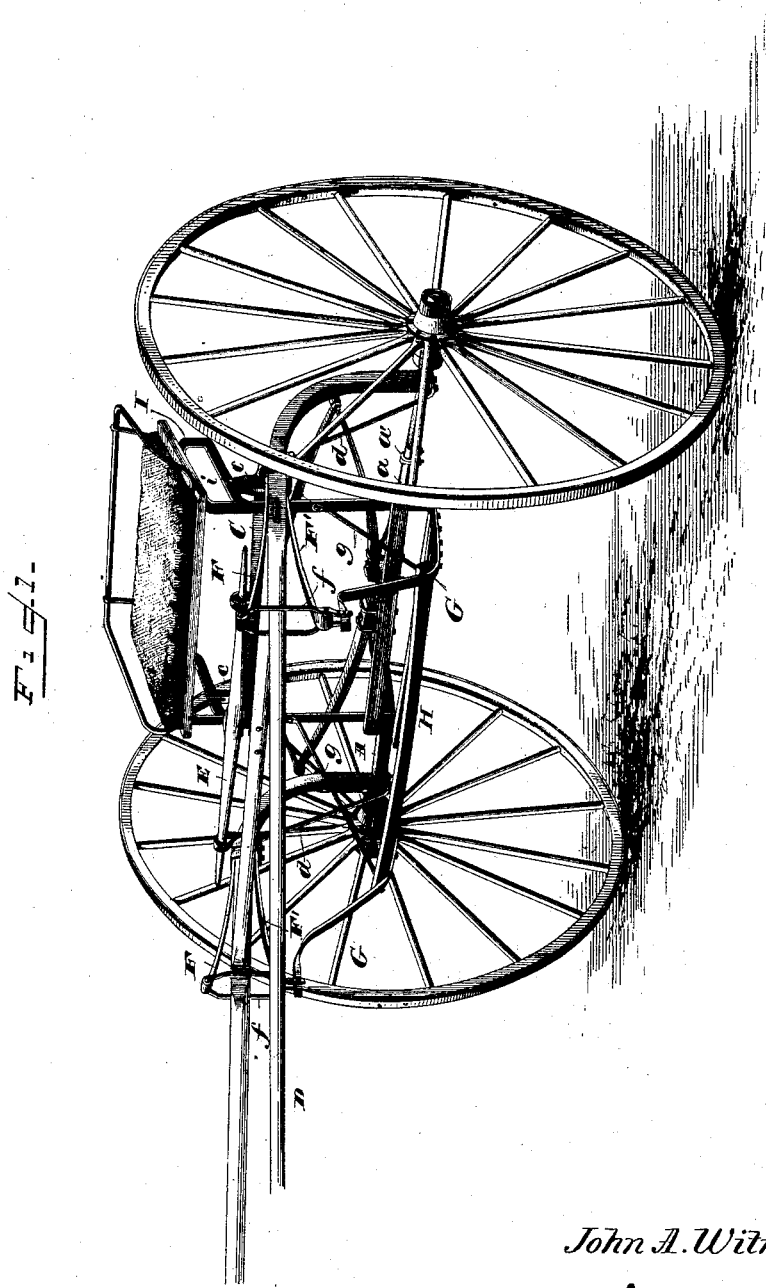
Figure 2:
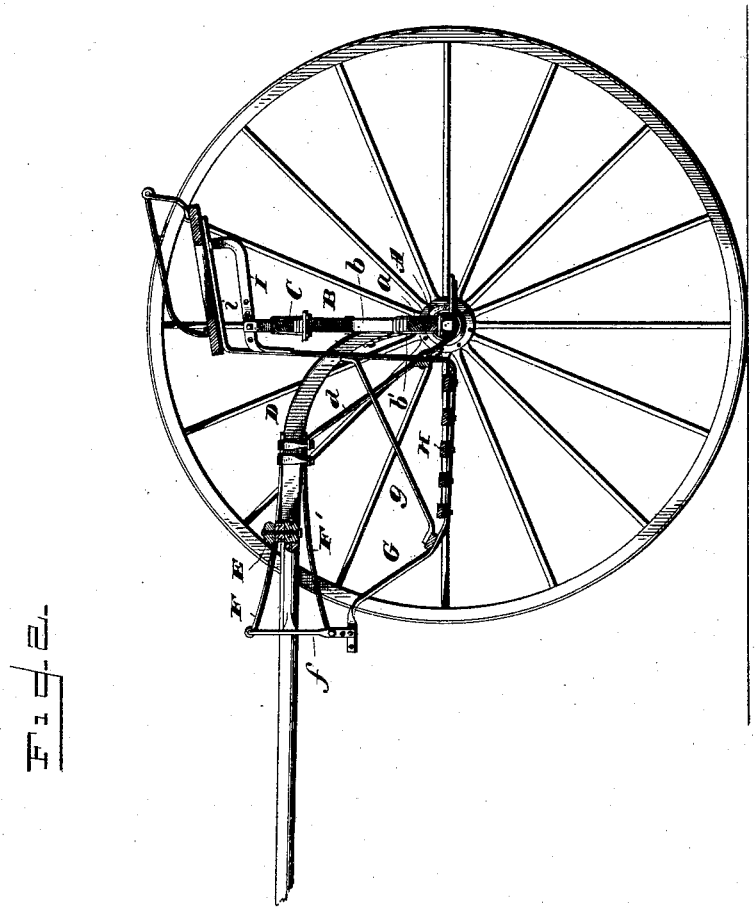
Figure 3:
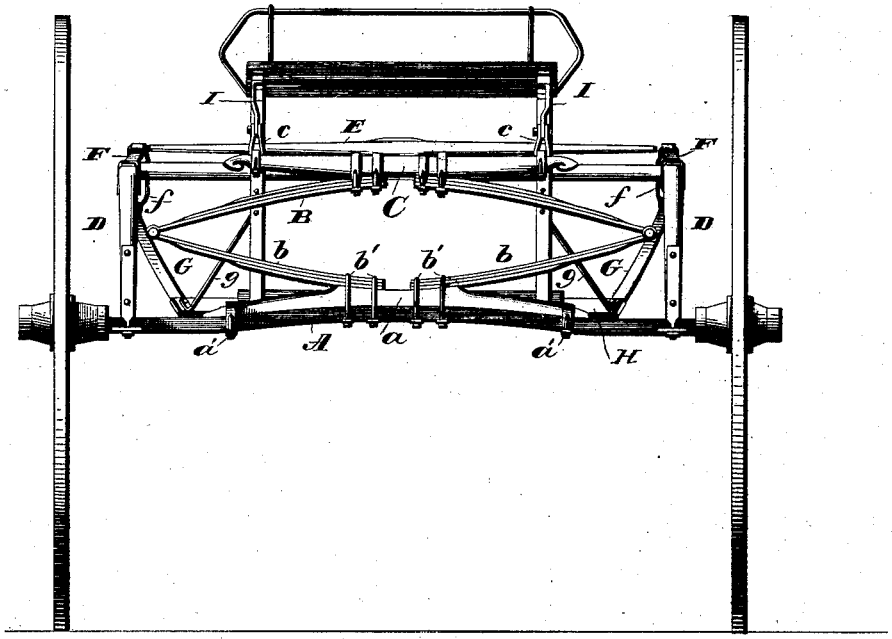

In the accompanying drawings, which illustrate my invention, Figure 1 is a perspective view of a road-cart constructed in accordance with my invention. Fig. 2 is a vertical sectional view, and Fig. 3 is a rear view.

A refers to the axle, which is bent upwardly at its central portion, and above this upwardly-curved portion of the axle is secured a bolster, *a*, said bolster being attached to the axle by clips *a'*. The lower sections, *b*, of the springs B are secured above this bolster *a* by clips *b'*, which pass over the ends of this spring, which is divided centrally, as shown, so as to attach these ends rigidly to the bolster, the clips passing around the ends of these springs, bolster, and axle. The upper sections of the spring B are clipped to the transverse bar C, to which the seat is suitably connected, as will be hereinafter fully set forth. By dividing the spring B, as shown in the accompanying drawings, this construction affords in a road-cart an extra side-spring action, and experiments have shown that this form of spring is much more desirable in a road-cart where there is only a main spring than should said plates be connected to each other centrally. Moreover, by this construction of the spring B, should one side of the vehicle sag by weight being constantly carried on one side of the seat, the spring can be readily adjusted by loosening the clips and moving the same either in or out, as may be desired. Moreover, should one of the spring-plates break, it can be readily replaced without removing the entire spring, as has heretofore been necessary.

D refers to the thills or shafts, the rear ends thereof being curved downwardly to a point immediately above the axle, where they are clipped to the axle, the lower ends of these thills being provided on their front and rear sides with plates the ends of which are formed into bolts, so that they can be passed through the flattened and perforated ends of the brace-bars *d*, which extend upwardly and are attached to the under side of the thills at a point adjacent to where said thills commence to bend downwardly, thereby bracing the bent portions of the thills, so as to render them perfectly rigid, while said thills are connected immovably to the axle. The thills or shafts D D are connected to each other by the usual cross-bar, above which is attached the single-tree E, in the usual manner.

F and F' refer to spring-plates, the ends of which are formed into eyes for the attachment thereto of loops *f f*. These spring-plates F and F' are rigidly clipped or bolted to the upper and under sides of the thills adjacent to the upper forward ends of the brace-bars *d*, and they diverge or have a spring tendency away from the thill from the points of connection thereto. The loops *f f* are first passed through the eyes in the ends of the upper spring-plate, F, and they are connected with the lower spring-plate, F', by bolts which pass through perforations therein and through the eyes in the lower spring-plates, and beneath this connecting-bolt the ends of the loops extend downwardly and are provided with a series of perforations, through one of which a bolt passes for connecting thereto the front ends of the seat-irons G G, said front ends being bent horizontally, the ends being twisted or turned so as to occupy a vertical position.

These seat-irons G G from the loops $ff$ extend downwardly and are provided with a horizontal portion to which the floor-boards H are bolted, and from these floor-boards the bars G are bent upwardly and then rearwardly, and to the upper rearwardly-bent portion the seat is bolted.

Under the seat-supporting irons G are attached bars I, which extend from the seat downwardly and forwardly, parallel therewith, the parallel portion which is immediately under the seat having a series of perforations, $i$, therein, while the terminal portion of these irons I extend downwardly and are riveted or otherwise suitably secured to the vertical portion of the seat-irons G.

The bars C are provided near their ends with suitable clips having upwardly-extending portions $c$, which engage with the sides of the irons I and are secured thereto by suitable bolts, which pass through one of the perforations $i$.

By constructing the seat-supporting irons as hereinbefore described and connecting the same to the different parts of the vehicle, as set forth, I can adjust the seat so that it will assume any position which the driver may consider the most convenient, and as the seat is not connected directly to the thills or axle, the motion which is imparted to said thill and axle by the movement of the horse or wheel traveling over rough ground is not imparted to the seat, said movement being entirely taken up by the spring-plates F and F' and the spring B, while the forward or pulling movement of the horse is rendered imperceptible by the loops $ff$.

The seat-supporting iron G is provided with suitable braces, $g\ g$, and the foot-boards H may extend upwardly on the boards G and forwardly, as shown in the drawings.

The loops $f$, hereinbefore referred to, are of such a size that the thills may pass freely through them, so that said shafts may move up and down with the movement of the horse without imparting said movement to the seat-supporting irons.

By providing clips having bifurcated upwardly-extending portions $c$, and connecting the seat-irons thereto by a bolt, the seat will be permitted to have a limited rocking movement upon the cross-bar which is secured to the thills. This connection will obviate movement being imparted to the seat in case of sudden jarring or jerking.

I claim—

1. In a two-wheel vehicle, the combination of the thills having downwardly-bent ends, which are rigidly attached to the axle, spring-plates F and F', attached to said thills and connected to each other by loops through which the thills pass, seat-supporting irons connected to the lower portion of said loops and to the seat, and a spring attached to the axle and provided with a cross-bar to which the seat-supporting irons are attached, the parts being organized substantially as shown, and for the purpose set forth.

2. In a road-cart or two-wheel vehicle, a main seat-supporting spring made up of upper and lower sections which are centrally separated from each other, the ends of the sections being secured to the axle and body-bolster, so as to be independently adjustable thereon, substantially as shown, and for the purpose set forth.

3. The combination, in a road-cart, of a spring, B, seat-supporting irons I and G, and spring-plates F and F', attached to the thills and connected by loops $f$, which engage with the seat-irons G, substantially as shown, and for the purpose set forth.

4. The combination, in a road-cart, of the seat-irons I and G, bent substantially as shown, said supporting-irons being provided immediately under the seat with a series of perforations, $i$, and at the front ends with perforations whereby the parts may be adjustably secured to loops $ff$ and to the spring-bar C, substantially as shown, and for the purpose set forth.

5. The combination, with a road-cart, of the seat-supporting irons G and I, which are rigidly connected to each other and to the seat-frame, the forward ends of the irons G being bent outwardly, as shown, and adjustably connected to loops or stirrups $f$, which encircle the thills, spring-plates F F', rigidly attached to the thills, and a spring, B, secured to the axle and provided with a spring bar, with clips engaging with the seat-iron I, and brace-bars $g$ and $d$ for bracing the seat-irons and bent portions of the thills, substantially as shown, and for the purpose set forth.

In testimony whereof I affix my signature in presence of two witnesses.

JOHN A. WITMER.

Witnesses:
AARON S. ZOOK,
FRANK A. HASCALL.